Patented Mar. 30, 1954

2,673,860

UNITED STATES PATENT OFFICE 2,673,860

PREPARATION OF FURAN-$\alpha,\alpha'$-DICARBOXYLIC ACID ESTERS

Richard Kuhn and Karl Dury, Heidelberg, Germany

No Drawing. Application July 16, 1951, Serial No. 237,078

1 Claim. (Cl. 260—347.5)

This invention relates to the preparation of furan-$\alpha,\alpha'$-dicarboxylic acid esters.

If an $\alpha,\alpha'$-diketoadipic acid ester or an $\alpha,\alpha'$-dihydroxymuconic acid ester or an acyl derivative of the latter, is treated with a dehydrating agent, e. g. concentrated sulfuric acid, ring closure occurs, even in the cold, without saponification, to give a furan-$\alpha,\alpha'$-dicarboxylic acid ester in practically quantitative yield. These esters are compounds of potential value as intermediates in chemical syntheses and have valuable pharmacological properties. Thus furan-$\alpha,\alpha'$-dicarboxylic acid diethyl ester has strong anesthetic action which is similar to that of cocaine with respect to speed of initiation and duration of total anesthesia (measured on the cornea of the rabbit's eye).

Examples

In the following examples parts by weight and volume are to be taken in metric units.

One part by weight of $\alpha,\alpha'$-dihydroxymuconic acid diethyl ester is dissolved in 5 volumes of concentrated sulfuric acid and allowed to stand for 2 hours at approximately 20° C. The mixture is then poured on ice and crystallized from petroleum ether. The yield is 95% of the theory of furan-$\alpha,\alpha'$-dicarboxylic acid diethyl ester as white needles having a melting point of 47° C.

From $\alpha,\alpha'$-diacetoxymuconic acid diethyl ester under the same conditions 98% of the theory of pure furan-$\alpha,\alpha'$-dicarboxylic acid diethyl ester is obtained.

In a corresponding manner from the dimethyl, dipropyl and di-n-butyl esters of $\alpha,\alpha'$-dihydroxymuconic acid are obtained the dimethyl ester (M. P. 107° C.), di-n-propyl ester (boiling point/12 mm., 164° C.) and the di-n-butyl ester (M. P. 40° C.) of furan-$\alpha,\alpha'$-dicarboxylic acid.

The dehydration can also be effected by other agents, e. g. by heating with silver sulfate.

We claim:

The method of preparing a furan-$\alpha,\alpha'$-dicarboxylic acid lower alkyl ester which comprises dissolving a lower alkyl diester of a dicarboxylic acid selected from the group consisting of $\alpha,\alpha'$-diketoadipic acid, $\alpha,\alpha'$-dihydroxymuconic acid and acyl derivatives of $\alpha,\alpha'$-dihydroxymuconic acid in concentrated sulfuric acid at room temperature, allowing the solution to stand until ring closure has been effected, and precipitating the desired ester by diluting the reaction mixture with water while cooling to absorb the heat of dilution.

RICHARD KUHN.
KARL DURY.

References Cited in the file of this patent

Fieser and Fieser, "Organic Chemistry," pp. 54–56 (1944).
Beilstein, vol. 18, pp. 328–330.
Chem. Abs., vol. 38, col. 1230.